March 17, 1953  R. A. NAGLE  2,631,400
FISHING ROD SUPPORT AND SIGNAL
Filed April 7, 1950
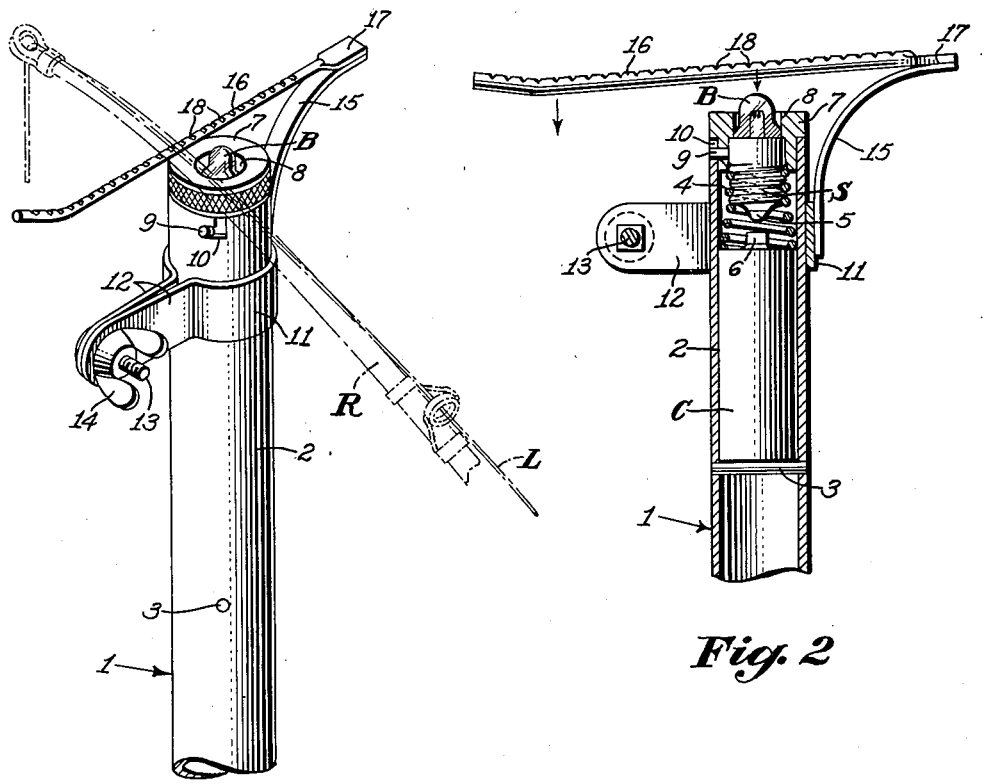
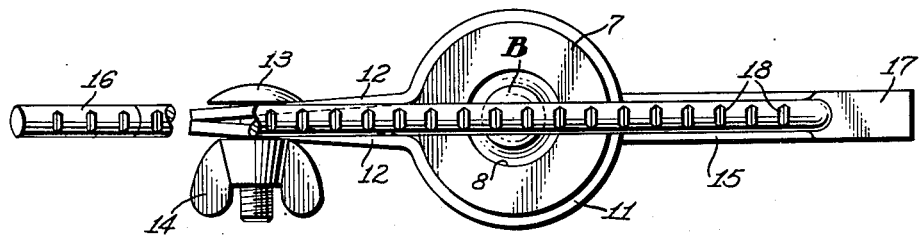
INVENTOR.
Richard A. Nagle
BY
Mason, Fenwick & Lawrence
ATTORNEYS Patented Mar. 17, 1953

2,631,400

UNITED STATES PATENT OFFICE 2,631,400

FISHING ROD SUPPORT AND SIGNAL

Richard A. Nagle, Mansfield, Ohio

Application April 7, 1950, Serial No. 154,612

3 Claims. (Cl. 43—17)

This invention relates to a device for supporting the tip of a fishing rod or a fishing line associated with signalling means by which the strike of a fish occasions a visible signal, thus enabling a fisherman to conveniently use a number of rods or lines and relax while waiting for a strike on one or another of them.

An object of the invention is to provide a device of the character indicated of improved and simplified construction lending itself to adjustment through a relatively wide range and adapted to operate with accuracy when a fish strikes.

Further objects will more particularly appear in the course of the following detailed description.

The invention consists in the novel construction, arrangement and combinations of parts hereinafter more particularly described and claimed.

One sheet of drawings accompanies this specification as part thereof, in which like reference characters indicate like parts throughout.

In the drawings:

Figure 1 is a fragmentary perspective view illustrating the arrangement of a fishing rod with the upper end of the improved device;

Figure 2 is a vertical cross section taken through the upper end of the supporting device; and Figure 3 is a plan view of the device when in operative position.

Referring to the drawings in which is illustrated one practical embodiment of the invention, 1 indicates a tubular supporting member which is preferably constructed of metal or the like, and which may have its lower end pointed and adapted to be inserted into the sand or soil of the bank, or alternatively as desired, supported by a tripod arrangement (not shown), or in a suitable socket such as an oar-lock socket in a boat or the like, the essential feature being that this tubular supporting member 1 is intended to be maintained in a vertical position by some suitable means when the device is in use.

The upper end of the tubular member 1 is formed as a chamber for a dry cell C by providing an internal abutment, as by means of a transverse pin 3 extending through the bore of the tubular member. In this chamber 2 at the upper end of the tubular member is positioned a dry cell C having its central electrode 6 outwardly directed, and upon the marginal wall of the cell C is supported a compression spring 4, the upper end of which is threadedly engaged with the threaded end S of a conventional electric light bulb B. The electric light bulb B is slidably engaged in a central bore provided in a cap member 7 adapted to be removably associated with the upper end of the tubular member 1 as by a bayonet joint formed by an L-slot 10 cut in the upper end of the tube 1 and a laterally projecting pin 9 formed on the cap 7, so that the cap 7 can be readily removed when desired, thus permitting the removal of the bulb B, the compression spring 4 and the cell C. As previously indicated the bulb B is freely slidable in the bore of the cap 7 with its glass end projecting outwardly beyond the outer end of the cap 7 throughout the central orifice 8.

By reason of the structure thus far described, it will be apparent that the bulb B is normally held out of electrical contact with the cell C, but that by a pressure downwardly on the exposed end of the bulb the central contact 5 of the bulb will be brought into electrical contact with the central electrode 6 of the cell, thereby completing a circuit through the bulb and creating a light flash.

Slidably secured upon the exterior of the tube 1 as by a U-clamp 11, is a transverse rest member 16 in the form of a small rod having its upper face provided with a plurality of spaced transverse grooves 18 adapted to receive and support the tip of the fishing rod R or the fishing line L if the line is used without a rod. One end of the supporting bar 16 is rigidly secured, as at 17, to an arcuate spring 15, the opposite end of which spring 15 is rigidly secured to the U-shaped clamp 11, which U-shaped clamp 11 has its legs 12—12 brought into superposed relationship and connected by a clamping bolt 13 associated with a thumb nut 14.

By reason of this structure it will be apparent that the rest rod 16 can be adjusted vertically with respect to the supporting tube 1 as desired, and that the sensitiveness of the device can be still further increased by selecting the particular transverse groove 18 upon which the rod tip or line is rested.

With the device as described the fisherman will mount the tubular rod 1 in a vertical position and rest the tip end of his rod or the hand line by placing same in one of the transverse grooves 18 of the rest bar 16. The handle end of the rod will, of course, be rested upon the ground, or some suitable part of the boat, or in the case of a hand line, the end of the line will be secured in some suitable manner. Upon a strike by a fish, pressure on the line and rod tip will cause the deflection of the rest bar 16 against the tension of the arcuate spring 15, thus causing the rest bar to contact the outer exposed end of the light bulb B and force the light bulb inwardly to make electrical contact with the cell C, thereby illuminating the bulb and giving a visible signal to the fisherman that a fish has struck that particular line and that it requires attention.

Various modifications will readily suggest themselves to those skilled in the art but within the scope of the present invention as claimed.

Having thus described my invention, I claim:

1. A signal device for a fishing rod comprising a supporting member formed at one end with a socket therein, a closure cap for the socket having an orifice therethrough, an electric cell in the socket, an incandescent light bulb slidably positioned in the socket between the cell and cap with the bulb part projecting through the orifice in the cap, spring means normally spacing the confronting contact points of the cell and bulb from one another and providing an electrical conduit between the cell wall and bulb, a rest member to support a fishing rod, and a resilient arm connecting one end of the rest member with the supporting member to maintain the rest member extending transversely over and spaced above the bulb, said rest member adapted to be tilted under increased pressure by the fishing rod to contact said projecting bulb part and force the bulb down to establish electrical contact with said cell.

2. A signal device for a fishing rod comprising a supporting member formed at one end with a socket therein, a cap for the end of the socket formed with a central orifice therethrough, an electric cell positioned in the socket with its central electrode directed toward and spaced from the cap, an electric bulb of the screw stud type slidably positioned in the socket with its bulb part extending through the orifice in the cap, a coil spring engaging the stud part of the bulb and the wall of the cell to space the terminal contact of the bulb from the central electrode of the cell, and a fishing rod supporting rest member resiliently supported transversely of the supporting member above and spaced from the bulb, said rest member adapted to be tilted under increased pressure by the fishing rod to contact said projecting bulb part and force the bulb down to establish electrical contact with said cell.

3. A supporting device for fishing rod or line comprising a tubular supporting member adapted to be held in a vertical position, an abutment in the bore of said support to form a seat for a dry cell positioned in the bore at its upper end with its central electrode outwardly directed, a removable cap for the upper end of the support formed with a central orifice therethrough, an electric light bulb of the threaded stud type of a size to permit it to slide freely in the tubular member with its bulb part extending outwardly through the orifice in the cap, a coil spring engaging the stud of the bulb and the wall of the cell to space the central contact of the bulb above the central electrode of the cell, a clamp mounted on the upper end of the support and vertically adjustable thereon, an arcuate spring secured by one end to said clamp and a rest member secured by one end to the free end of said spring, said rest member extending over the orifice in the cap in normal spaced relationship to the end of the bulb extending through said orifice, said rest member formed with a plurality of longitudinally spaced transverse guide grooves throughout its length to receive and support a fishing rod and adapted to be tilted downwardly under increased pressure by the fishing rod to contact said outwardly extending bulb part and force the bulb inwardly of said supporting member to establish electrical contact with said cell.

RICHARD A. NAGLE.

REFERENCES CITED

The following references are of record in the file of this patent:

UNITED STATES PATENTS

| Number | Name | Date |
|---|---|---|
| 2,166,657 | Evelyn | July 18, 1939 |
| 2,180,228 | Florman | Nov. 14, 1939 |
| 2,225,214 | Goertzen | Dec. 7, 1940 |
| 2,262,040 | Van Dyne Pell | Nov. 11, 1941 |
| 2,481,881 | Schneider | Sept. 13, 1949 |
| 2,567,777 | Massino | Sept. 11, 1951 |